US010116882B2

(12) United States Patent
Dobashi et al.

(10) Patent No.: US 10,116,882 B2

(45) Date of Patent: Oct. 30, 2018

(54) DISPLAY APPARATUS FOR SUPERIMPOSING AND DISPLAYING IMAGES

(71) Applicant: CASIO COMPUTER CO., LTD., Shibuya-ku, Tokyo (JP)

(72) Inventors: Koki Dobashi, Hamura (JP); Junichi Hato, Hamura (JP); Masahiro Oda, Hamura (JP); Hideaki Matsuda, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/627,616

(22) Filed: Jun. 20, 2017

(65) Prior Publication Data

US 2018/0035059 A1 Feb. 1, 2018

(30) Foreign Application Priority Data

Jul. 29, 2016 (JP) ................................. 2016-149936

(51) Int. Cl.

*H04N 5/775* (2006.01)
*H04N 5/93* (2006.01)

(Continued)

(52) U.S. Cl.

CPC ............. *H04N 5/272* (2013.01); *G06T 11/60* (2013.01); *G11B 27/002* (2013.01);

(Continued)

(58) Field of Classification Search

CPC ........ H04N 5/272; H04N 5/2628; H04N 9/87; G06T 11/60; G11B 27/002; G11B 27/005; G06F 3/04883

USPC ....... 386/230, 219, 231, 239, 248, 278, 280, 386/282

See application file for complete search history.

(56) References Cited

U.S. PATENT DOCUMENTS 6,507,359 B1 * 1/2003 Muramoto ............. H04N 5/772 345/8
7,809,175 B2 * 10/2010 Roehrig ................ A61B 6/463 382/128
2016/0364837 A1 * 12/2016 Aoyama ................ G06T 11/60

FOREIGN PATENT DOCUMENTS

JP 05-337232 12/1993
JP 1996-182786 7/1996

(Continued)

OTHER PUBLICATIONS

Japanese Office Action for Japanese Patent Application No. 2016-149936 dated Jul. 3, 2018.

(Continued)

*Primary Examiner* — Robert Chevalier

(74) *Attorney, Agent, or Firm* — Amin, Turocy & Watson LLP

(57) ABSTRACT

A central control unit of a terminal apparatus performs control for displaying a plurality of images in a display unit by superimposing them such that at least one of the images can be observed through one or more other images distinguishably, designating one or more of the plurality of images, detecting a user manipulation performed for the plurality of images, and changing the designated one or more images spatially or temporally according to the detected user manipulation while keeping the plurality of images superimposed and displayed.

19 Claims, 8 Drawing Sheets

(51) Int. Cl.

| | |
|---|---|
| ***H04N 5/272*** | (2006.01) |
| ***G06T 11/60*** | (2006.01) |
| ***G11B 27/00*** | (2006.01) |
| ***G11B 27/34*** | (2006.01) |
| ***H04N 5/262*** | (2006.01) |
| ***H04N 9/87*** | (2006.01) |
| ***G11B 27/031*** | (2006.01) |
| *H04N 5/76* | (2006.01) |
| *G06F 3/0488* | (2013.01) |

(52) U.S. Cl.

CPC .......... *G11B 27/005* (2013.01); *G11B 27/031* (2013.01); *G11B 27/34* (2013.01); *H04N 5/2628* (2013.01); *H04N 9/87* (2013.01); *G06F 3/04883* (2013.01); *H04N 5/76* (2013.01)

(56) References Cited

FOREIGN PATENT DOCUMENTS

| | | |
|---|---|---|
| JP | 2004-134891 | 4/2004 |
| JP | 2004-260765 | 9/2004 |
| JP | 2006-243248 | 9/2006 |
| JP | 2007-288637 | 11/2007 |
| JP | 2014-094029 | 5/2014 |
| JP | 2014-230002 | 12/2014 |
| JP | 2015-53040 | 3/2015 |
| JP | 2015-231206 | 12/2015 |

OTHER PUBLICATIONS

Japanese Office Action for Japanese Patent Application No. 2016-149936 dated Sep. 11, 2018.

* cited by examiner

1(2)
CENTRAL CONTROL UNIT
101
MEMORY
102
STORAGE UNIT
103
COMMUNICATION CONTROL UNIT
106
106a
108
DISPLAY UNIT
104
DISPLAY PANEL
104a
MANIPULATION INPUT UNIT
105
TOUCH PANEL
105a
OPERATION PROCESSING UNIT
107
DESIGNATING UNIT
107a
DETECTING UNIT
107b
DISPLAY CONTROL UNIT
107c

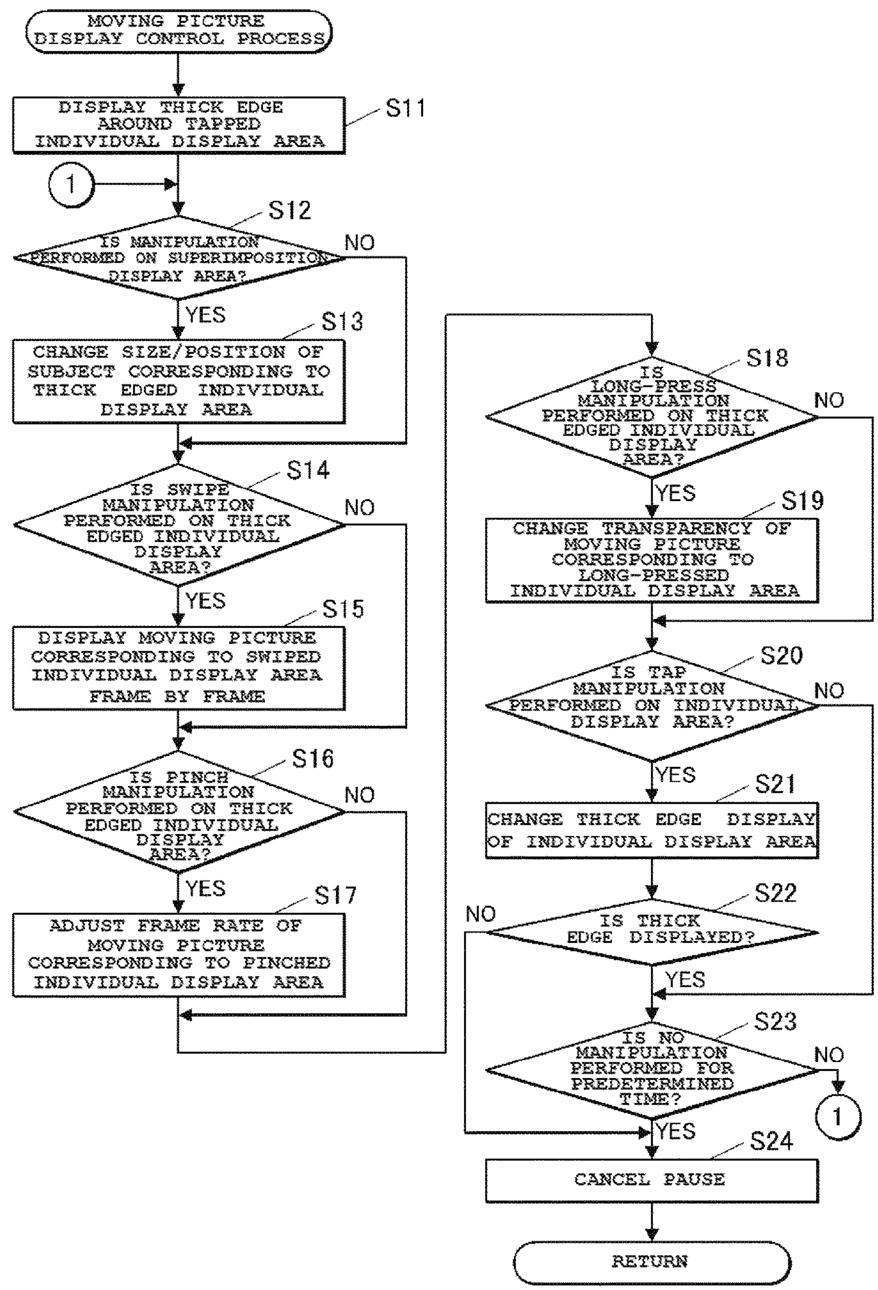
FIG. 4
MOVING PICTURE DISPLAY CONTROL PROCESS
DISPLAY THICK EDGE AROUND TAPPED INDIVIDUAL DISPLAY AREA
S11
1
S12
IS MANIPULATION PERFORMED ON SUPERIMPOSITION DISPLAY AREA?
NO
YES
S13
CHANGE SIZE/POSITION OF SUBJECT CORRESPONDING TO THICK EDGED INDIVIDUAL DISPLAY AREA
S14
IS SWIPE MANIPULATION PERFORMED ON THICK EDGED INDIVIDUAL DISPLAY AREA?
NO
YES
S15
DISPLAY MOVING PICTURE CORRESPONDING TO SWIPED INDIVIDUAL DISPLAY AREA FRAME BY FRAME
S16
IS PINCH MANIPULATION PERFORMED ON THICK EDGED INDIVIDUAL DISPLAY AREA?
NO
YES
S17
ADJUST FRAME RATE OF MOVING PICTURE CORRESPONDING TO PINCHED INDIVIDUAL DISPLAY AREA
S18
IS LONG-PRESS MANIPULATION PERFORMED ON THICK EDGED INDIVIDUAL DISPLAY AREA?
NO
YES
S19
CHANGE TRANSPARENCY OF MOVING PICTURE CORRESPONDING TO LONG-PRESSED INDIVIDUAL DISPLAY AREA
S20
IS TAP MANIPULATION PERFORMED ON INDIVIDUAL DISPLAY AREA?
NO
YES
S21
CHANGE THICK EDGE DISPLAY OF INDIVIDUAL DISPLAY AREA
S22
IS THICK EDGE DISPLAYED?
NO
YES
S23
IS NO MANIPULATION PERFORMED FOR PREDETERMINED TIME?
NO
1
YES
S24
CANCEL PAUSE
RETURN

DISPLAY APPARATUS FOR SUPERIMPOSING AND DISPLAYING IMAGES

CROSS-REFERENCE TO RELATED APPLICATIONS

This application is based upon and claims the benefit of priority under 35 USC 119 of Japanese Patent Application No. 2016-149936 filed on Jul. 29, 2016, the entire disclosure of which is incorporated herein by reference in its entirety for all purposes.

BACKGROUND OF THE INVENTION

1. Field of the Invention

The present invention relates to a display apparatus, a display control method, and a computer readable storage medium.

2. Description of the Related Art

Conventionally, an image display apparatus is known in which an image of a user's form when playing a sport and an image of an ideal form of the sport are superimposed and displayed together such that one image is observed through the other image in order to compare the user's form with the ideal form (for example, a form of a professional athlete or a form of the user when the user is in a good condition), as disclosed in Japanese Patent Application Laid-Open Publication No. 2015-53040 published on Mar. 19, 2015.

SUMMARY OF THE INVENTION

According to an aspect of the present invention, a display apparatus is provided. The display apparatus includes a display unit, and a processor that is configured to perform control for superimposing and displaying a plurality of images in the display unit such that at least one of the plurality of images can be observed through one or more other images distinguishably, designate one or more of the plurality of images, and detect a user manipulation performed for the plurality of images. Further, the process performs control for changing the designated one or more images spatially or temporally according to the detected user manipulation while keeping the plurality of images superimposed and displayed.

According to another aspect of the present invention, a display control method is provided. The display control method includes superimposing and displaying a plurality of images in a display unit such that at least one of the plurality of images can be observed through one or more other images distinguishably, designating one or more of the plurality of images, and detecting a user manipulation performed for the plurality of images, and superimposing and displaying a plurality of images includes changing the designated one or more images spatially or temporally according to the detected user manipulation while keeping the plurality of images superimposed and displayed.

According to another aspect of the present invention, a non-transitory computer-readable storage medium for storing a program readable by a computer is provided. The program controls the computer to execute functions of superimposing and displaying a plurality of images in a display unit such that at least one of the plurality of images can be observed through one or more other images distinguishably, designating one or more of the plurality of images, and detecting a user manipulation performed for the plurality of images. The function of superimposing and displaying a plurality of images includes changing the designated one or more images spatially or temporally according to the detected user manipulation while keeping the plurality of images superimposed and displayed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings.

Here:

FIG. 4 is a flow chart for showing an example of a moving picture display control process performed by the terminal apparatus shown in FIG. 1.

DETAILED DESCRIPTION OF THE PREFERRED EMBODIMENT

Hereinafter, embodiments of the present invention will be described with reference to the accompanying drawings. The scope of the invention is not intended to be limited to the illustrated examples.

First Embodiment

Figure 1:
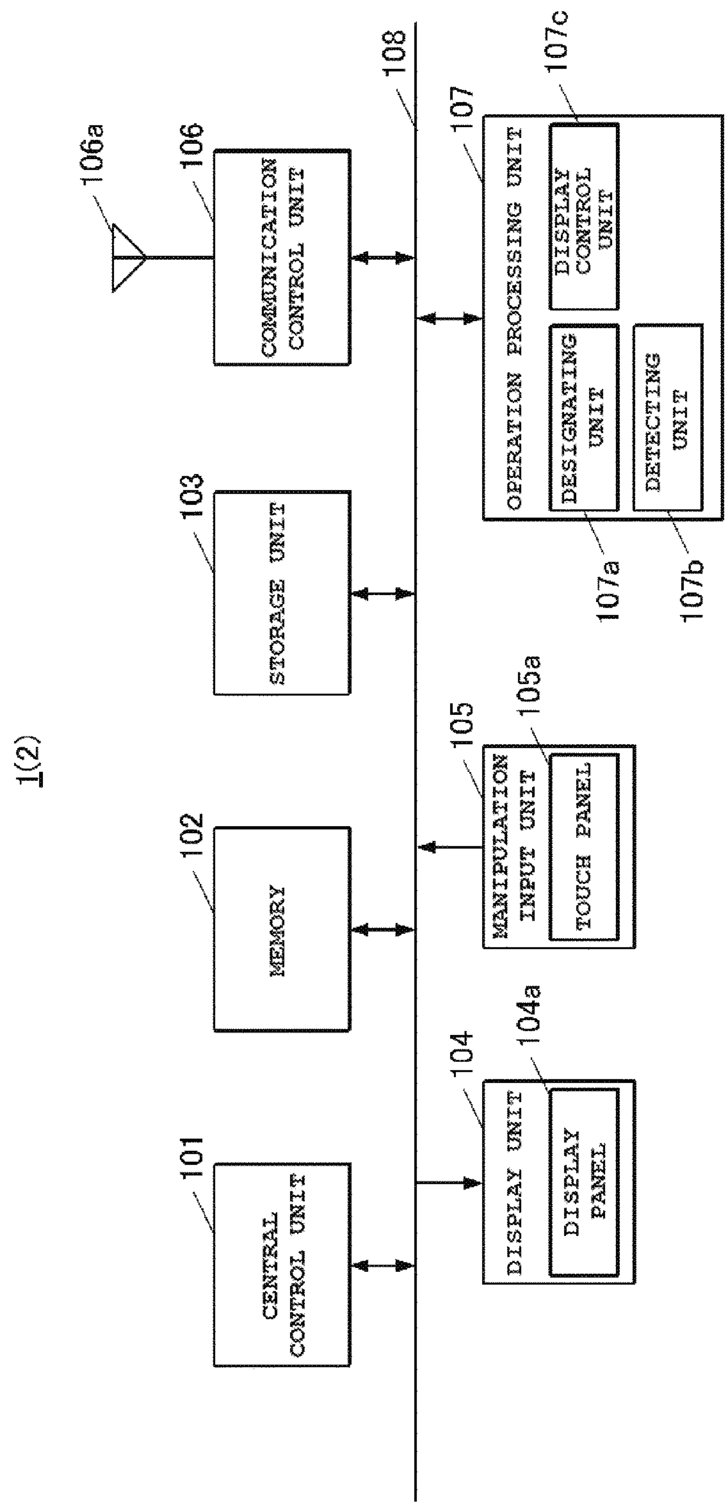
FIG. 1 is a block diagram showing a schematic configuration of a terminal apparatus which is a display apparatus according to an embodiment to which the present invention is applied.

FIG. 1 is a block diagram showing a schematic configuration of a terminal apparatus 1 which is a display apparatus according to a first embodiment to which the present invention is applied.

The terminal apparatus 1 according to the present embodiment can be realized by a computer equipped with a touch panel, such as a tablet PC or a smart phone. The terminal apparatus 1 includes a central control unit 101, a memory 102, a storage unit 103, a display unit 104, a manipulation input unit 105, a communication control unit 106, and an operation processing unit 107.

The central control unit 101, the memory 102, the storage unit 103, the display unit 104, the manipulation input unit 105, the communication control unit 106, and the operation processing unit 107 are connected via a bus line 108 with each other.

The central control unit 101 controls each unit of the terminal apparatus 1. More specifically, the central control unit 101 includes a CPU (Central Processing Unit) which is not shown in the drawings, and performs various control operations according to various programs for the terminal apparatus 1 (which are not shown in the drawings).

The memory 102 includes, for example, a DRAM (Dynamic Random Access Memory) and temporarily stores data processed by the central control unit 101, the operation processing unit 107, or the like.

The storage unit 103 includes, for example, an SSD (Solid State Drive) and records image data of a still picture or a moving picture encoded according to a predetermined compression format (for example, a JPEG format, an MPEG format, or the like) by an image processing unit (not shown in the drawings) therein. The image data stored in the storage unit 103 may be data of an image captured by an imaging unit (not shown in the drawings) of the terminal apparatus 1 or data of an image captured by an external imaging apparatus (not shown in the drawings) which is transmitted from the external imaging apparatus to the terminal apparatus 1 and recorded in the storage unit 103.

The storage unit 103 may include a removable storage medium (not shown in the drawings), for example, and control reading/writing data from/to the storage medium.

The display unit 104 displays an image or the like in a display area of a display panel (a display means) 104*a*.

More specifically, the display unit 104 displays an image based on image data of a predetermined size decoded by the image processing unit (not shown in the drawings) in the display area of the display panel 104*a*.

Figure 2A:
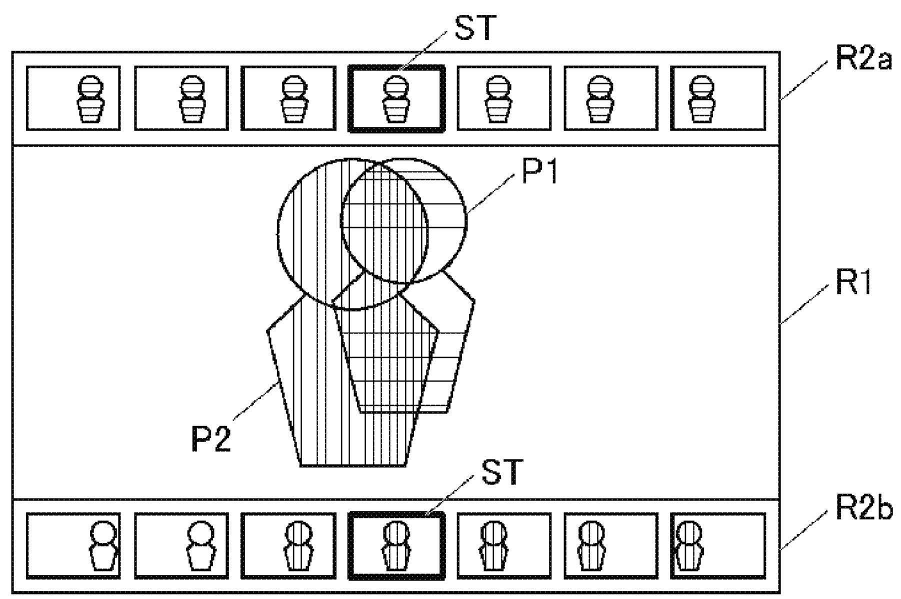
FIG. 2A shows an example of a state in which a moving picture A and a moving picture B are superimposed and displayed (i.e. played back).

As will be described later, the display unit 104 displays a plurality of moving pictures (for example, two moving pictures) desired by a user (i.e. which the user wants to compare) by superimposing them in a superimposition display area R1 of the display panel 104*a* under control of a display control unit 107*c* of the operation processing unit 107 such that each of the plurality of moving pictures can be observed through one or more other moving pictures distinguishably, as shown in FIG. 2A. Further, the display unit 104 displays a plurality of consecutive frame images (for example, in thumbnail view) selected from frame images composing one of the moving pictures (hereinafter, referred to as "a moving picture A") in an individual display area R2*a* in the upper part of the display panel 104*a*. The display unit 104 displays a plurality of consecutive frame images (for example, in thumbnail view) selected from frame images composing the other one of the moving pictures (hereinafter, referred to as "a moving picture B") in an individual display area R2*b* in the lower part of the display panel 104*a*. The number of frame images displayed in each of the individual display areas R2*a* and R2*b* shows the number of frames per unit time, that is, a playback speed of the corresponding moving picture.

For example, the display panel 104*a* may include a liquid crystal display (LCD) panel, an organic EL (Electro-Luminescence) display panel, or the like, without limitation.

The manipulation input unit 105 is provided for the user to perform a predetermined manipulation to operate the terminal apparatus 1. More specifically, the manipulation input unit 105 includes a power button for power ON/OFF manipulations, a button for instruction of selection of one of various modes or functions, or the like (all not shown in the drawings).

In the case that a user manipulates a button, the manipulation input unit 105 outputs a manipulation instruction according to the manipulated button to the central control unit 101. The central control unit 101 controls each unit to execute a predetermined operation (for example, playback of the moving picture) according to the manipulation instruction output from the manipulation input unit 105.

Further, the manipulation input unit 105 includes a touch panel 105*a* provided integrally with the display panel 104*a* of the display unit 104.

The touch panel 105*a* detects a contact position of the user's finger (or hand), a touch pen, or the like, which directly or indirectly contacts with a display screen forming the display area of the display panel 104*a*. The touch panel 105*a* is provided on the display screen of the display panel 104*a* or under the display screen, for example, and detects the XY coordinates of the contact position on the display screen at a predetermined sampling period by one of various methods such as an electrostatic capacity method, a resistance film method, and an ultrasonic surface acoustic wave method. The touch panel 105*a* outputs a position signal relating to the XY coordinates of the contact position to the operation processing unit 107.

The communication control unit 106 receives and transmits data via a communication antenna 106*a* and a communication network.

More specifically, the communication antenna 106*a* is capable of data transmission and reception corresponding to a predetermined communication standard (for example, W-CDMA (Wideband Code Division Multiple Access), CDMA 2000, or GSM (Global System for Mobile Communications; Registered Trademark) adopted by the terminal apparatus 1 in communication with a wireless base station (not shown in the drawing). According to a communication protocol corresponding to the predetermined communication standard, the communication control unit 106 receives/transmits data from/to the wireless base station via the communication antenna 106*a* by a communication channel set according to the communication standard.

The communication network is a network in which the terminal apparatus 1 is connected with an external device, for example, via the wireless base station or a gateway server (not shown in the drawings). The communication network is established using a dedicated line or an existing general public line. One of various types of line such as WAN (Wide Area Network) and LAN (Local Area Network) can be applied to the communication network.

The configuration of the communication control unit 106 described above is an example. The communication control unit 106 of the present invention is not limited to the configuration and can be modified properly as necessary. For example, the communication control unit 106 may be provided with a wireless LAN module or a Bluetooth (Registered Trademark) module (not shown in the drawings).

The wireless LAN module may be accessible to the communication network via an access point (not shown in the drawings) or may operate in a peer-to-peer (Ad-hoc) mode to establish a wireless communication line with the external device directly without passing through the access point. Further, the Bluetooth module may perform wireless communication with the external device using a synchronized communication scheme based on the Bluetooth communication specification.

The operation processing unit 107 includes a designating unit 107*a*, a detecting unit 107*b*, and a display control unit 107*c*.

Further, each unit of the operation processing unit 107 includes a predetermined logic circuit, for example. However, the present invention is not limited to this embodiment.

The designating unit 107*a* designates at least one image of a plurality of images superimposed and displayed in the superimposition display area R1 of the display panel 104*a*.

More specifically, the designating unit (a designating means) 107*a* designates at least one image of the plurality of images superimposed and displayed in the superimposition display area R1 of the display panel 104*a* (the moving picture A, the moving picture B) according to a manipulation performed by the user on the individual display area R2*a* or R2*b* of the display panel 104*a*.

Figure 2B:
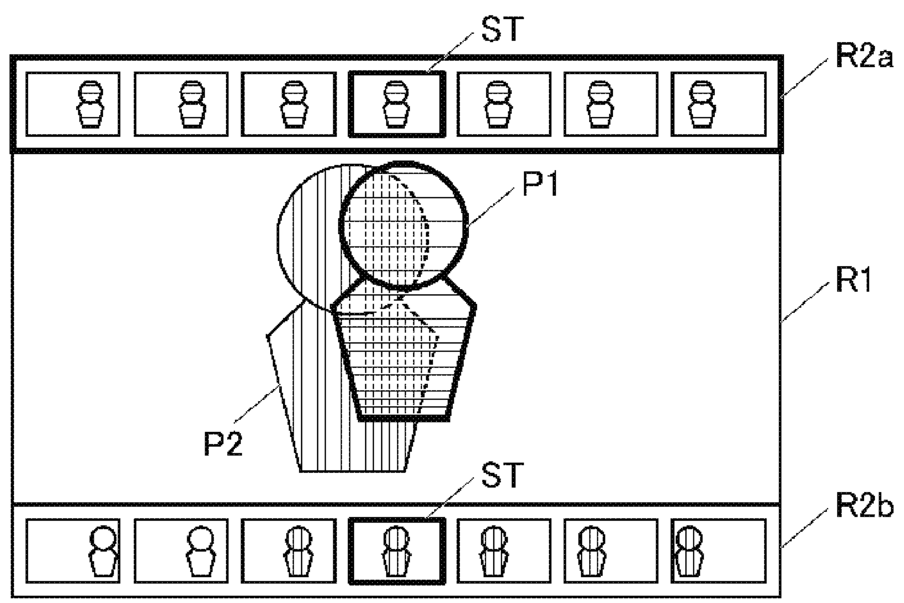
FIG. 2B shows an example of a state in which the moving picture A of the moving picture A and the moving picture B is designated.
Figure 2C:
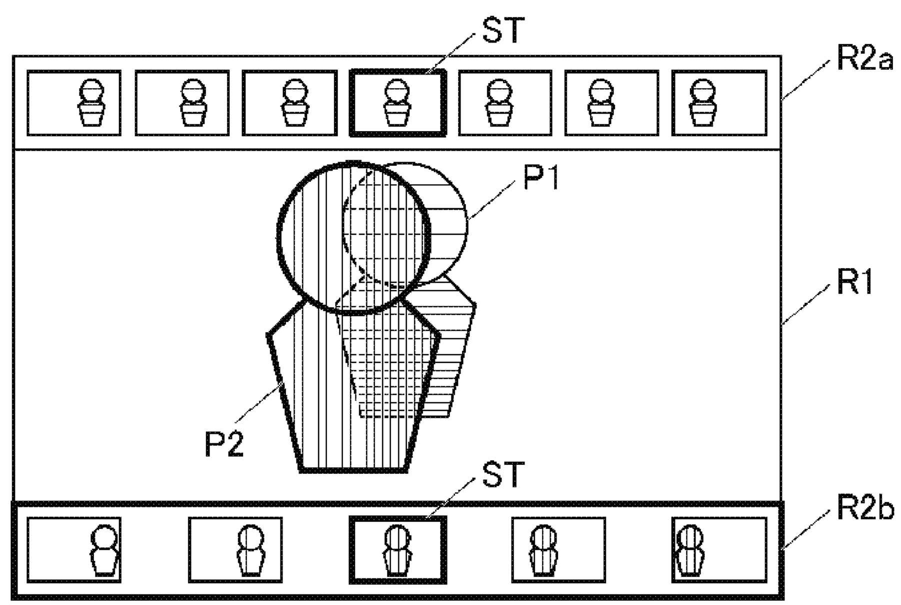
FIG. 2C shows an example of a state in which the moving picture B of the moving picture A and the moving picture B is designated.

For example, the designating unit 107*a* designates the moving picture A based on a tap manipulation performed by the user on a portion of the touch panel 105*a* corresponding to the individual display area R2*a*. In the case that the moving picture A is designated by the designating unit 107*a*, a thick edge is displayed around the individual display area R2*a* under control of the display control unit 107*c* and the contour of a subject P1 of the moving picture A which is being displayed in the superimposition display area R1 is emphasized, as shown in FIG. 2B. Further, the designating unit 107*a* designates the moving picture B based on a tap manipulation performed by the user on a portion of the touch panel 105*a* corresponding to the individual display area R2*b*. In the case that the moving picture B is designated by the designating unit 107*a*, a thick edge is displayed around the individual display area R2*b* under control of the display control unit 107*c* and the contour of a subject P2 of the moving picture B which is being displayed in the superimposition display area R1 is emphasized, as shown in FIG. 2C. In addition, in the case that the user taps both of the portion of the touch panel 105*a* corresponding to the individual display area R2*a* and the portion of the touch panel 105*a* corresponding to the individual display area R2*b*, the designating unit 107*a* designates both of the moving picture A and the moving picture B. In this case, although not shown, the thick edge is displayed around each of the individual display areas R2*a* and R2*b* under the control of the display control unit 107*c*. The contours of the subject P1 of the moving picture A and the subject P2 of the moving picture B which are being displayed in the superimposition display area R1 are not emphasized.

Further, the thick edge display is one of examples of display for distinguishing which one of the images is designated. The examples may include changing the edge's color or the like.

In the case that the portion of the touch panel 105*a* corresponding to the thick edged individual display area (for example, the individual display area R2*a*) is tapped, in other words, a re-tap manipulation (a toggle manipulation) is performed, the designating unit 107*a* cancels the designation of the corresponding moving picture (for example, the moving picture A). In the case that the designation of the moving picture is canceled by the designating unit 107*a*, the thick edge display is canceled and a normal edge is displayed around the individual display area corresponding to the moving picture under the control of the display control unit 107*c*.

Further, in the case that no manipulation is performed on the touch panel 105*a* for a predetermined period of time (for example, two seconds) in the state in which at least one moving picture (for example, the moving picture A) is designated, the designating unit 107*a* shifts to a state in which no moving picture is designated (a normal state). In this case, the normal edge is displayed around each of the individual display areas R2*a* and R2*b* under the control of the display control unit 107*c*, as shown in FIG. 2A.

The detecting unit 107*b* detects the user manipulation performed for the plurality of images (the moving picture A, the moving picture B).

In other words, the detecting unit (a detecting means) 107*b* detects the user manipulation performed for the plurality of images superimposed and displayed in the superimposition display area R1 of the display panel 104*a* (i.e. the moving picture A, the moving picture B) and/or the moving pictures A and B individually displayed in the individual display areas R2*a* and R2*b*.

More specifically, the detecting unit 107*b* detects a pinch manipulation, a swipe manipulation, a long-press manipulation, or the like, as the user manipulation. Here, the pinch manipulation means a gesture of picking with two fingers (for example, a thumb and a forefinger). The pinch manipulation is classified into a pinch-out manipulation of widening the space between two fingers pressing the touch panel 105*a* to enlarge the space and a pinch-in manipulation of narrowing the space between two fingers pressing the touch panel 105*a* to reduce the space. The swipe manipulation means a gesture of sliding a finger while the finger is contacting with the touch panel 105*a*. The long-press manipulation means a gesture of pressing the touch panel 105*a* for a predetermined period of time (for example, one second) or longer.

The display control unit 107*c* performs control for displaying the plurality of (for example, two) images (the moving picture A, the moving picture B) by superimposing them in the superimposition display area R1 of the display panel 104*a* such that at least one of the plurality of images can be observed through the other image distinguishably and for displaying the moving picture A and the moving picture B in the individual display area R2*a* and R2*b*, respectively.

More specifically, the display control unit (a display control means) 107*c* performs control for displaying frame images composing the moving picture A and frame images composing the moving picture B frame by frame by superimposing them in the superimposition display area R1 and for displaying a plurality of consecutive frame images of the moving picture A (for example, thumbnails of the frame images) in a row in the individual display area R2*a* and a plurality of consecutive frame images of the moving picture B (for example, thumbnails of the frame images) in a row in the individual display area R2*b*.

The control for superimposing and displaying may be performed such that only a part of the plurality of images can be observed through one or more other images or all of the plurality of images can be observed through each other.

More specifically, a superimposition playback mode for moving pictures is selected based on a predetermined manipulation of the manipulation input unit 105 by the user, for example. For example, in the case that the image data of the moving picture A of ideal golf swing of the subject P1 such as a professional golfer and the image data of the moving picture B of golf swing of the user (i.e. the subject P2) are selected in the mode based on a predetermined manipulation of the manipulation input unit 105, the display control unit 107*c* performs control for displaying consecutively (i.e. playback display) the subject P1 included in the frame images composing the moving picture A and the subject P2 included in the frame images composing the moving picture B frame by frame by superimposing them in the superimposition display area R1 and for displaying a plurality of consecutive frame images of the moving picture A (for example, the thumbnails of the frame images) in a row in the individual display area R2*a* and a plurality of consecutive frame images of the moving picture B (for example, the thumbnails of the frame images) in a row in the individual display area R2*b*, for example, as shown in FIG. 2A. Further, a frame image (in thumbnail view) with a thick edge disposed in the center (a superimposition adjustment reference position ST) of each of the individual display areas R2*a* and R2*b* corresponds to each of one of the frame images of the moving picture A and one of the frame images of the moving picture B which are being superimposed and displayed in the superimposition display area R1.

The display control unit 107*c* performs control for changing the image (the moving picture A, the moving picture B) designated by the designating unit 107*a* spatially or temporally according to the user manipulation detected by the detecting unit 107*b* and display the image, while maintaining the state in which the subject P1 of the frame images composing the moving picture A and the subject P2 of the frame images composing the moving picture B are superimposed and displayed frame by frame in the superimposition display area R1.

As the control for changing the image spatially, the display control unit 107*c* performs control for changing a spatial size or a spatial position of the image (the moving picture A, the moving picture B) designated by the designating unit 107*a* and displaying the image. Further, as the control for changing the image temporally, the display control unit 107*c* performs control for changing a frame rate of the image (the moving picture A, the moving picture B) designated by the designating unit 107*a* or a temporal position in the moving picture and displaying the image.

More specifically, the display control unit 107*c* determines whether or not the tap manipulation is performed by the user on the individual display area R2*a* and/or the individual display area R2*b* while displaying consecutively (i.e. playing back) the subject P1 of the frame images composing the moving picture A and the subject P2 of the frame images composing the moving picture B frame by frame by superimposing them in the superimposition display area R1, for example, as shown in FIG. 2A. In the case that it is determined that the tap manipulation is performed on the individual display area R2*a* and/or the individual display area R2*b*, the display control unit 107*c* stops playback display in the superimposition display area R1 and performs control for displaying the thick edge around the tapped individual display area(s).

For example, in the case that the user performs the tap manipulation on the portion of the touch panel 105*a* corresponding to the individual display area R2*a* and the designating unit 107*a* designates the moving picture A, the display control unit 107*c* performs control for displaying the thick edge around the individual display area R2*a*, as shown in FIG. 2B. At this time, the display control unit 107*c* performs control for emphasizing the contour of the subject P1 of the moving picture A designated by the designating unit 107*a* of the subject P1 of the moving picture A and the subject P2 of the moving picture B which are being displayed in the superimposition display area R1, as shown in FIG. 2B.

Further, in the case that the user performs the tap manipulation on the portion of the touch panel 105*a* corresponding to the individual display area R2*b* and the designating unit 107*a* designates the moving picture B, the display control unit 107*c* performs control for displaying the thick edge around the individual display area R2*b*, as shown in FIG. 2C. At this time, the display control unit 107*c* performs control for emphasizing the contour of the subject P2 of the moving picture B designated by the designating unit 107*a* of the subject P1 of the moving picture A and the subject P2 of the moving picture B which are being displayed in the superimposition display area R1, as shown in FIG. 2C.

In addition, in the case that the user performs the tap manipulation on the portion of the touch panel 105*a* corresponding to each of the individual display areas R2*a* and R2*b* and the designating unit 107*a* designates both of the moving picture A and the moving picture B, the display control unit 107*c* performs control for displaying the thick edge around each of the individual display areas R2*a* and R2*b* (not shown in the drawings). At this time, the display control unit 107*c* does not perform control for contour emphasis for any of the subject P1 of the moving picture A and the subject P2 of the moving picture B which are being displayed in the superimposition display area R1.

In the case that the thick edge is displayed around at least one of the individual display areas R2*a* and R2*b*, the display control unit 107*c* determines whether or not the pinch manipulation or the swipe manipulation is detected on the superimposition display area R1 by the detecting unit 107*b*. In the case that the display control unit 107*c* determines that the pinch manipulation is detected on the superimposition display area R1 by the detecting unit 107*b*, it performs control for enlarging or reducing the frame image of the moving picture corresponding to the thick edged individual display area of the frame images of the moving picture A and the moving picture B which are being superimposed and displayed in the superimposition display area R1, i.e. changing the spatial size of the frame image corresponding to the superimposition adjustment reference position ST, and displaying it. For example, in the case that the thick edge is displayed only around the individual display area R2*a* (see FIG. 2B), the display control unit 107*c* performs control for enlarging or reducing only the frame image of the moving picture A which is being superimposed and displayed in the superimposition display area R1 according to the pinch manipulation on the superimposition display area R1. In the case that the thick edge is displayed only around the individual display area R2*b* (see FIG. 2C), the display control unit 107*c* performs control for enlarging or reducing only the frame image of the moving picture B which is being superimposed and displayed in the superimposition display area R1 according to the pinch manipulation on the superimposition display area R1. In the case that the thick edges are displayed around both of the individual display area R2*a* and the individual display area R2*b*, the display control unit 107*c* performs control for enlarging or reducing the frame image of the moving picture A and the frame image of the moving picture B, which are being superimposed and displayed in the superimposition display area R1, simultaneously, according to the pinch manipulation on the superimposition display area R1. Further, in the present embodiment, the display control unit 107*c* can perform control for reducing an original image (i.e. one of the frame images composing the moving picture) displayed in the superimposition display area R1 to a size smaller than the size of the original image and displaying the reduced image based on the so-called pinch-in manipulation by the user on the touch panel 105*a*, for example, unlike general display control for enlargement and reduction. In this case, the display control unit 107*c* performs control for displaying an image of one color (such as white, block, or blue) in a blank space outside the area in which the reduced image is being displayed.

In the case that the thick edge is displayed around at least one of the individual display areas R2*a* and R2*b* and it is determined that the swipe manipulation is detected on the superimposition display area R1 by the detecting unit 107*b*, the display control unit 107*c* performs control for scroll-displaying the frame image of the moving picture corresponding to the thick edged individual display area of the frame images of the moving picture A and the moving picture B which are being superimposed and displayed in the superimposition display area R1, i.e. changing the spatial position of the frame image corresponding to the superimposition adjustment reference position ST. For example, in the case that the thick edge is displayed only around the individual display area R2*a* (see FIG. 2B), the display control unit 107*c* performs control for scroll-displaying only the frame image of the moving picture A which is being superimposed and displayed in the superimposition display area R1 according to the swipe manipulation on the superimposition display area R1. In the case that the thick edge is displayed only around the individual display area R2*b* (see FIG. 2C), the display control unit 107*c* performs control for scroll-displaying only the frame image of the moving picture B which is being superimposed and displayed in the superimposition display area R1 according to the swipe manipulation on the superimposition display area R1. In the case that the thick edges are displayed around both of the individual display area R2*a* and the individual display area R2*b*, the display control unit 107*c* performs control for scroll-displaying the frame image of the moving picture A and the frame image of the moving picture B, which are being superimposed and displayed in the superimposition display area R1, simultaneously, according to the swipe manipulation on the superimposition display area R1. Further, in the present embodiment, the display control unit 107*c* can perform control for scrolling the original image (i.e. one of the frame images composing the moving picture) displayed in the superimposition display area R1 in a range where the whole of the original image is not placed outside the display area based on the so-called swipe manipulation by the user on the touch panel 105*a*, for example, unlike general scroll-display control. In this case, as well, the display control unit 107*c* performs control for displaying an image of one color (such as white, block, or blue) in a blank space outside the area in which the image is being displayed.

In the case that the thick edge is displayed around at least one of the individual display areas R2*a* and R2*b*, the display control unit 107*c* determines whether or not the swipe manipulation, the pinch manipulation, or the long-press manipulation is detected on the thick edged individual display area (R2*a* and/or R2*b*) by the detecting unit 107*b*. In the case that the display control unit 107*c* determines that the swipe manipulation is detected on the thick edged individual display area (R2*a* and/or R2*b*) by the detecting unit 107*b*, it performs control for playing back and displaying the frame images of the moving picture (corresponding to the individual display area on which the swipe manipulation is performed), which is being displayed in the superimposition display area R1, frame by frame, according to the amount of slide of the user's finger when performing the swipe manipulation and to slide display the frame images (in thumbnail view) which are being displayed in the swiped individual display area, i.e. to change the temporal position of the frame images.

More specifically, the superimposition adjustment reference position ST is set to the center of each of the individual display areas R2*a* and R2*b*, for example, as shown in FIGS. 2B and 2C. It is possible to superimpose the subject P1 and the subject P2 relating to frame images of the user's desired timing by performing the swipe manipulation on the individual display area (R2*a* and/or R2*b*) such that each of the frame images relating to the subject P1 and the subject P2 which the user wants to superimpose is displayed at the superimposition adjustment reference position ST. The superimposition adjustment reference position ST is not limited to the center of each of the individual display areas R2*a* and R2*b*. In another embodiment, the superimposition adjustment reference position ST is the left end of each of the individual display areas R2*a* and R2*b*.

In the case that the thick edge is displayed around at least one of the individual display areas R2*a* and R2*b* and it is determined that the pinch manipulation is detected on the thick edged individual display area (R2*a* and/or R2*b*) by the detecting unit 107*b*, the display control unit 107*c* performs control for changing the space between two adjacent frame images of the frame images (in thumbnail view) displayed in the individual display area on which the pinch manipulation is performed according to the size of the space between the user's fingers when performing the pinch manipulation. Thus, the display control unit 107*c* performs control for changing the frame rate of the moving picture corresponding to the individual display area and displaying it.

For example, in the case that the thick edge is displayed only around the individual display area R2*b* (see FIG. 2C) and the pinch manipulation is performed from the frame image at the center of the individual display area R2*b* (i.e. the frame image at the superimposition adjustment reference position ST), which is a touch start position, in the lateral direction (in the left and right directions), the display control unit 107*c* performs control for changing the frame rate of the moving picture B corresponding to the individual display area R2*b* while keeping the frame image of the touch start position at the center. In the case that the touch start position is the frame image at the left end of the individual display area R2*b*, the pinch manipulation is performed only in the right direction. Thus, the display control unit 107*c* performs control for changing the frame rate of the moving picture B corresponding to the individual display area R2*b* while keeping the frame image of the touch start position at the left end.

In the case that the thick edge is displayed around at least one of the individual display areas R2*a* and R2*b* and it is determined that the long-press manipulation is detected on the thick edged individual display area (R2*a* and/or R2*b*) by the detecting unit 107*b*, the display control unit 107*c* performs control for changing transparency of the frame image of the moving picture which is being displayed in the superimposition display area R1 (corresponding to the individual display area on which the long-press manipulation is performed) according to modes of the long-press manipulation.

More specifically, in the case that the thick edge is displayed only around the individual display area R2*a* (see FIG. 2B), the display control unit 107*c* performs control for increasing the transparency of the frame image of the moving picture A, which is being superimposed and displayed in the superimposition display area R1, up to 100% and decreasing the transparency of the frame image of the moving picture B, which is being superimposed and displayed in the superimposition display area R1, to 0%, according to the length of time of the long-press manipulation.

Further, in the case that the thick edge is displayed only around the individual display area R2*b* (see FIG. 2C), the display control unit 107*c* performs control for increasing the transparency of the frame image of the moving picture B, which is being superimposed and displayed in the superimposition display area R1, up to 100% and decreasing the transparency of the frame image of the moving picture A, which is being superimposed and displayed in the superimposition display area R1, to 0%, according to the length of time of the long-press manipulation.

Further, in the case that the thick edges are displayed around both of the individual display areas R2*a* and R2*b* and it is determined that the long-press manipulation is detected on each of the individual display areas R2*a* and R2*b*, the display control unit 107*c* changes the transparency of each of the frame images of the moving picture A and the moving picture B which are being superimposed and displayed in the superimposition display area R1 back to a default value.

In the case that the tap manipulation is not performed on any of the individual display areas R2*a* and R2*b* and both of the individual display areas R2*a* and R2*b* are not thick edged, the display control unit 107*c* determines whether or not the swipe manipulation is detected on the superimposition display area R1 by the detecting unit 107*b*. In the case that it is determined that the swipe manipulation is detected on the superimposition display area R1 by the detecting unit 107*b*, the display control unit 107*c* controls forward/backward playback of the moving picture A and the moving picture B which are being superimposed and displayed in the superimposition display area R1 such that each of the moving picture A and the moving picture B is played back for the same period of time in a predetermined direction (for example, in the forward or backward direction) according to the amount of slide of the user's finger when performing the swipe manipulation. For example, in the case that the detecting unit 107*b* detects the swipe manipulation from left to right in the superimposition display area R1, the moving picture A and the moving picture B which are being superimposed and displayed in the superimposition display area R1 are played forward. On the other hand, in the case that the detecting unit 107*b* detects the swipe manipulation from right to left in the superimposition display area R1, the moving picture A and the moving picture B which are being superimposed and displayed in the superimposition display area R1 are played backwards (i.e. rewound).

Here, the forward/backward playback means playing in the forward/backward direction at a high/low speed relative to a normal playback speed and includes fast forward, fast backward, slow forward, and slow backward.

Figure 3:
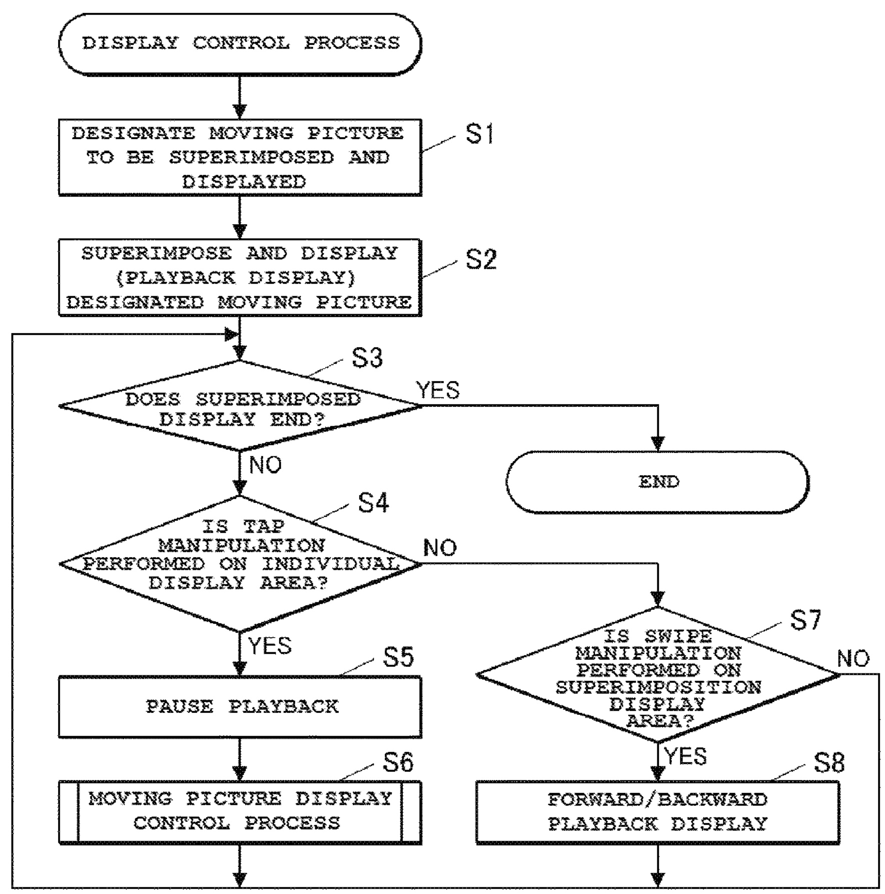
FIG. 3 is a flow chart for showing an example of a display control process performed by the terminal apparatus shown in FIG. 1.

In the following, a display control process performed by the terminal apparatus 1 according to the embodiment will be described. FIG. 3 is a flow chart for showing an example of the display control process. FIG. 4 is a flow chart for showing an example of a moving picture display control process.

As shown in FIG. 3, image data of moving pictures to be superimposed and displayed (i.e. the moving picture A and the moving picture B) is designated from the moving pictures stored in the storage unit 103 based on a predetermined manipulation of the manipulation input unit 105 by the user (Step S1). Then, the display control unit 107*c* reads the image data of each of the designated moving pictures from the storage unit 103 and performs control for superimposing and displaying a plurality of frame images of each of the moving pictures decoded by the image processing unit (not shown in the drawings) at a predetermined frame rate in the superimposition display area R1 of the display panel 104*a* (see FIG. 2A) (Step S2).

The display control unit 107*c* determines whether or not superimposed display of the moving pictures ends (Step S3). Here, there are two type of ending of the superimposed display of the moving pictures, i.e. one type of ending due to completion of playback of each of the moving pictures and the other type of ending based on a predetermined manipulation of the manipulation input unit 105 by the user.

In the case that it is determined that the superimposed display of the moving pictures ends (Step S3: YES), the display control process ends.

On the other hand, in the case that it is determined that the superimposed display of the moving pictures does not end (Step S3: NO), the display control unit 107*c* determines whether or not the tap manipulation is performed on the individual display area R2*a* and/or R2*b* (Step S4).

In the case that it is determined at Step S4 that the tap manipulation is performed on the individual display area R2*a* and/or R2*b* (Step S4: YES), the display control unit 107*c* pauses the superimposed display of each of the moving pictures (Step S5). Then, the display control unit 107*c* performs the moving picture display control process (Step S6) and returns to Step S3 to repeat the subsequent steps. The moving picture display control process will be described later.

In the case that it is determined at Step S4 that no tap manipulation is performed on the individual display area R2*a* and/or R2*b* (Step S4: NO), the control display unit 107*c* determines whether or not the swipe manipulation is performed on the superimposition display area R1, i.e. whether or not the detecting unit 107*b* detects the swipe manipulation on the superimposition display area R1 (Step S7).

In the case that it is determined at Step S7 that no swipe manipulation is performed on the superimposition display area R1 (Step S7: NO), the process returns to Step S3 and repeats the subsequent steps.

On the other hand, in the case that it is determined at Step S7 that the swipe manipulation is performed on the superimposition display area R1 (Step S7: YES), the display control unit 107*c* controls forward/backward playback of the moving picture A and the moving picture B which are being superimposed and displayed in the superimposition display area R1 such that each of the moving picture A and the moving picture B is played back for the same period of time in a predetermined direction (for example, in the forward or backward direction) according to the amount of slide of the user's finger when performing the swipe manipulation (Step S8). Then, the display control unit 107*c* returns to Step S3 and repeats the subsequent steps.

In the following, the moving picture display control process performed by the terminal apparatus 1 according to the embodiment will be described.

As shown in FIG. 4, the display control unit 107*c* performs control for displaying the thick edge around the individual display area(s) (R2*a* and/or R2*b*) on which the tap manipulation is performed (see Step S4 of display control process shown in FIG. 3) (Step S11). At this time, the display control unit 107*c* performs control for emphasizing the contour of the subject (for example, the subject P1) of the moving picture (for example, the moving picture A) corresponding to the tapped individual display area (for example, the individual display area R2*a*) which is being displayed in the superimposition display area R1. In the case that the tap manipulation is performed on both of the individual display areas R2*a* and R2*b*, the display control unit 107*c* does not emphasize any of the contour of the subject P1 of the moving picture A and the contour of the subject P2 of the moving picture B which are being displayed in the superimposition display area R1.

Then, the display control unit 107*c* determines whether or not a manipulation (in this embodiment, the swipe manipulation or the pinch manipulation) is performed on the superimposition display area R1, i.e. whether or not the detecting unit 107*b* detects the swipe or pinch manipulation on the superimposition display area R1 (Step S12).

In the case that it is determined at Step S12 that the manipulation (in this embodiment, the swipe manipulation or the pinch manipulation) is performed on the superimposition display area R1 (Step S12: YES), the display control unit 107*c* performs control for changing the size or position of the frame image (for example, the subject P1) of the moving picture (for example, the moving picture A) corresponding to the tapped individual display area (for example, the individual display area R2*a*) which is being displayed in the superimposition display area R1 according to the manipulation performed on the superimposition display area R1 (i.e. the swipe manipulation or the pinch manipulation) (Step S13) and proceeds to the Step S14.

On the other hand, in the case that it is determined at Step S12 that the manipulation (in this embodiment, the swipe manipulation or the pinch manipulation) is not performed on the superimposition display area R1 (Step S12: NO), the process skips Step S13 and proceeds to Step S14.

Then, the display control unit 107*c* determines whether or not the swipe manipulation is performed on the individual display area around which the thick edge is displayed at Step S11 (R2*a* and/or R2*b*), i.e. whether or not the detecting unit 107*b* detects the swipe manipulation on the thick edged individual display area (Step S14).

In the case that it is determined at Step S14 that the swipe manipulation is performed on the thick edged individual display area (R2*a* and/or R2*b*) (Step S14: YES), the display control unit 107*c* performs control for frame by frame displaying the frame images of the moving picture (corresponding to the individual display area on which the swipe manipulation is performed), which is being displayed in the superimposition display area R1, according to the amount of slide of the user's finger when performing the swipe manipulation and for slide displaying the frame images (in thumbnail view) which are being displayed in the swiped individual display area (Step S15). Then, the display control unit 107*c* proceeds to Step S16.

On the other hand, in the case that it is determined at Step S14 that the swipe manipulation is not performed on the thick edged individual display area (R2*a* and/or R2*b*) (Step S14: NO), the process skips Step S15 and proceeds to Step S16.

Then, the display control unit 107*c* determines whether or not the pinch manipulation is performed on the individual display area around which the thick edge is displayed at Step S11 (R2*a* and/or R2*b*), i.e. whether or not the detecting unit 107*b* detects the pinch manipulation on the thick edged individual display area (Step S16).

In the case that it is determined at Step S16 that the pinch manipulation is performed on the thick edged individual display area (R2*a* and/or R2*b*) (Step S16: YES), the display control unit 107*c* performs control for changing the space between two adjacent frame images of the frame images (in thumbnail view) displayed in the individual display area on which the pinch manipulation is performed according to the size of the space between the user's fingers when performing the pinch manipulation, and for adjusting the frame rate of the moving picture corresponding to the individual display area accordingly and displaying it (Step S17). Then, the process proceeds to Step S18.

On the other hand, in the case that it is determined at Step S16 that the pinch manipulation is not performed on the thick edged individual display area (R2*a* and/or R2*b*) (Step S16: NO), the process skips Step S17 and proceeds to Step S18.

Then, the display control unit 107*c* determines whether or not the long-press manipulation is performed on the individual display area around which the thick edge is displayed at Step S11 (R2*a* and/or R2*b*), i.e. whether or not the detecting unit 107*b* detects the long-press manipulation on the thick edged individual display area (Step S18).

In the case that it is determined at Step S18 that the long-press manipulation is performed on the thick edged individual display area (R2*a* and/or R2*b*) (Step S18: YES), the display control unit 107*c* performs control for changing transparency of the frame image of the moving picture which is being displayed in the superimposition display area R1 (corresponding to the individual display area on which the long-press manipulation is performed) according to the modes of the long-press manipulation (Step S19) and proceeds to Step S20.

On the other hand, in the case that it is determined at Step S18 that the long-press manipulation is not performed on the thick edged individual display area (R2*a* and/or R2*b*) (Step S18: NO), the process skips Step S19 and proceeds to Step S20.

Then, the display control unit 107*c* determines whether or not the tap manipulation is performed on the individual display area R2*a* and/or R2*b* (Step S20).

In the case that it is determined at Step S20 that the tap manipulation is not performed on any of the individual display areas R2*a* and R2*b* (Step S20: NO), the process skips Step 21 to Step 22 and proceeds to Step S23.

On the other hand, it is determined at Step S20 that the tap manipulation is performed on the individual display area R2*a* and/or R2*b* (Step S20: YES), the display control unit 107*c* performs control for changing thick edge display of the tapped individual display area (Step S21). More specifically, in the case that the tap manipulation is a re-tap, i.e. the tap manipulation is performed on the thick edged individual display area, the display control unit 107*c* cancels the display of the thick edge around the individual display area. On the other hand, in the case that the tap manipulation is not a re-tap, the display control unit 107*c* performs control for displaying the thick edge around the tapped individual display area.

Then, the display control unit 107*c* determines whether or not at least one of the individual display areas R2*a* and R2*b* is thick edged by the tap manipulation performed thereon (Step S22).

In the case that it is determined at Step S22 that none of the individual display areas R2*a* and R2*b* is thick edged (Step S22: NO), the process skips Step S23 and proceeds to Step S24.

On the other hand, in the case that it is determined at Step S22 that at least one of the individual display areas R2*a* and R2*b* is thick edged (Step S22: YES), the process proceeds to Step S23.

Then, the display control unit 107*c* determines whether or not no manipulation is performed by the user on the touch panel 105*a* for a predetermined period of time (for example, two seconds) (Step S23).

In the case that it is determined at Step 23 that a manipulation is performed by the user on the touch panel 105*a* within the predetermined period of time (for example, two seconds) (Step S23: NO), the process returns to Step S12 and repeats the subsequent steps.

On the other hand, in the case that it is determined at Step 23 that no manipulation is performed by the user on the touch panel 105*a* for the predetermined period of time (for example, two seconds) (Step S23: YES) and it is determined that none of the individual display areas R2*a* and R2*b* is thick edged (Step S22: NO), the display control unit 107*c* cancels pause of the superimposed display (i.e. pause of playback) of each of the moving pictures in the superimposition display area R1 (Step S24) and the moving picture display control process ends.

As described above, the terminal apparatus 1 according to the present embodiment performs control for displaying the moving picture A and the moving picture B in the superimposition display area R1 by superimposing them such that each of the moving pictures can be observed through the other moving picture distinguishably, designating at least one image of the moving picture A and the moving picture B, and detecting the user manipulation for the moving picture A and the moving picture B. Further, the terminal apparatus 1 performs control for displaying the designated image by changing it spatially or temporally according to the detected user manipulation while keeping the moving picture A and the moving picture B superimposed and displayed.

Thus, since the terminal apparatus 1 according to the present embodiment performs control for displaying the designated image by changing it spatially or temporally according to the detected user manipulation while keeping the moving picture A and the moving picture B superimposed and displayed, there is no need to cancel the superimposed display when adjusting the size or position of the image. Therefore, spatial or temporal adjustment can be facilitated for the moving picture A and the moving picture B which are being superimposed and displayed such that each of the moving pictures can be observed through the other moving picture.

Further, since the terminal apparatus 1 according to the present embodiment performs control for displaying the designated image by changing the spatial size or the spatial position of the designated image as the control for changing it spatially, it is possible to properly adjust spatial superimposition of the moving picture A and the moving picture B.

Further, since the terminal apparatus 1 according to the present embodiment performs control for displaying the moving picture (the moving picture A, the moving picture B) by changing the frame rate of the moving picture or the temporal position in the moving picture as the control for changing it temporally, it is possible to properly adjust temporal superimposition of the moving picture A and the moving picture B.

The terminal apparatus 1 according to the present embodiment performs control further to display the moving picture A and the moving picture B in the plurality of individual display areas R2*a* and R2*b*, which are different from the superimposition display area R1 in which the moving picture A and the moving picture B are superimposed and displayed, respectively, and to designate at least one image of the moving picture A and the moving picture B according to the user manipulation on the individual display areas R2*a* and R2*b*. Thus, it is possible to facilitate the user's manipulation for the designation.

Further, the terminal apparatus 1 according to the present embodiment performs control for displaying the moving picture A and the moving picture B by simultaneously changing them temporally, while keeping the moving picture A and the moving picture B superimposed and displayed, according to the user manipulation performed on the superimposition display area R1 which is different from the manipulation for spatially changing the moving picture (the moving picture A, the moving picture B). Thus, it is possible to easily find a timing at which temporal superimposition of the moving picture A and the moving picture B is desired to be adjusted.

Further, the terminal apparatus 1 according to the present embodiment performs control for displaying a plurality of consecutive frame images (in thumbnail view) of the frame images composing each of the moving picture A and the moving picture B in a row in each of the plurality of individual display areas R2*a* and R2*b* while superimposing and displaying the frame images composing the moving picture A and the moving picture B frame by frame in the superimposition display area R1.

Thus, in the case of performing adjustment of temporal superimposition of the moving picture A and the moving picture B, it is possible to pick out frame images requiring the adjustment by comparing the plurality of consecutive frame images displayed in a row in each of the individual display areas R2*a* and R2*b*, by using the terminal apparatus 1 of the present embodiment. Therefore, the adjustment of temporal superimposition of the moving picture A and the moving picture B can be performed effectively.

Further, the terminal apparatus 1 according to the present embodiment performs control for displaying the moving picture A and the moving picture B by changing the transparency of the moving picture A and the moving picture B which are being superimposed and displayed in the superimposition display area R1 according to the user manipulation performed on the individual display areas R2*a*, R2*b* which is different from the manipulation for designating at least one of the moving picture A and the moving picture B.

Thus, according to the terminal apparatus 1 of the present embodiment, it is possible to check the state of superimposed display while focusing on one of the moving pictures (the moving picture A, the moving picture B) by changing the transparency of the moving picture A and the moving picture B which are being superimposed and displayed in the superimposition display area R1. Therefore, the adjustment of spatial superimposition of the moving picture A and the moving picture B can be performed properly.

Further, in the case that one image of the moving picture A and the moving picture B is designated, the terminal apparatus 1 according to the present embodiment performs control for superimposing and displaying the moving picture A and the moving picture B by emphasizing the designated image, i.e. emphasizing the contour of the subject of the image. Therefore, it is possible to easily distinguish the image for which the adjustment of superimposition is to be performed and to easily adjust the moving picture A and the moving picture B spatially or temporally.

Second Embodiment

In the following, a display apparatus 2 according to a second embodiment will be described. Since the schematic configuration of the display apparatus 2 according to the second embodiment is similar to that of the first embodiment, descriptions of the same elements will be omitted and the differences will be mainly described.

Figure 5A:
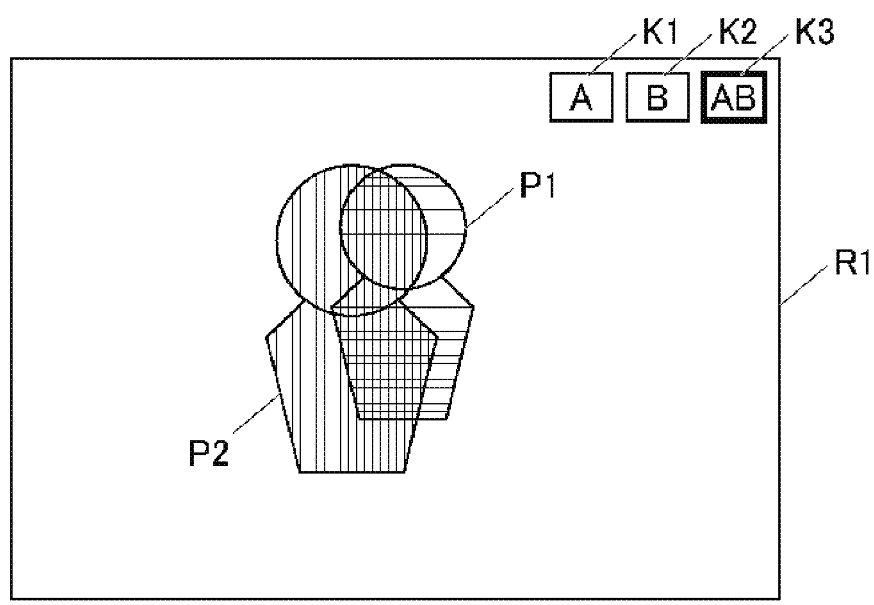
FIG. 5A shows an example of a state in which both of a still picture a and a still picture b are designated.
Figure 5B:
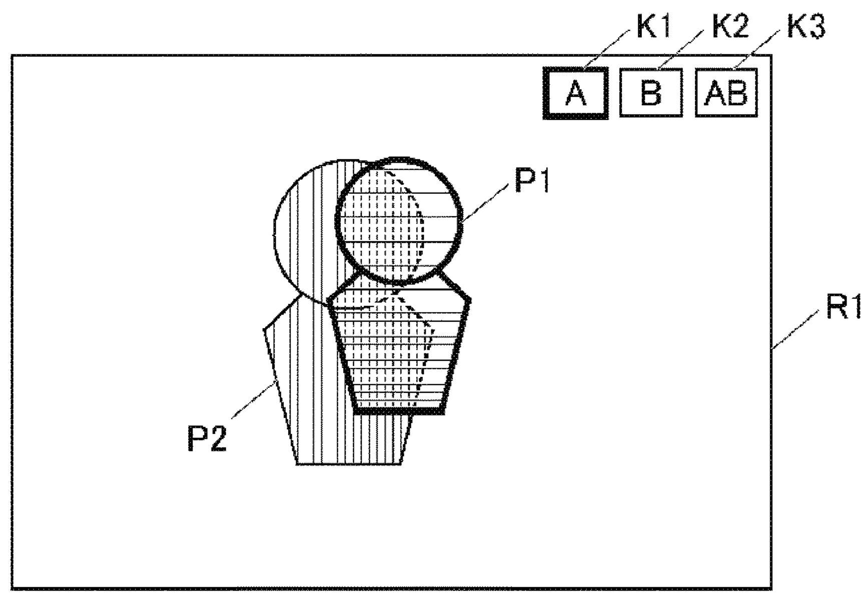
FIG. 5B shows an example of a state in which the still picture a of the still picture a and the still picture b is designated.

The display apparatus 2 according to the second embodiment is different from the first embodiment in that the display apparatus 2 includes no individual display area. The display apparatus 2 according to the second embodiment displays a plurality of images (for example, two images) which the user wants to compare in the superimposition display area R1 by superimposing the plurality of images such that one of the images can be observed through one or more other images distinguishably under control of the display control unit 107c as shown in FIGS. 5A and 5B and. Further, in the display apparatus 2 according to the second embodiment, the images to be superimposed are still pictures. The display control unit 107c performs only control for changing an image designated by the designating unit 107a spatially according to the user manipulation detected by the detecting unit 107b and displaying it while keeping the plurality of images superimposed and displayed.

The designating unit 107a designates at least one of the plurality of images (in the present embodiment, a still picture a and a still picture b) which are being superimposed and displayed in the superimposition display area R1 of the display panel 104a according to the user manipulation of one of image selection keys of a "A" key K1, a "B" key K2, and a "AB" key K3 displayed in the display panel 104a, as shown FIGS. 5A and 5B. The "A" key K1, the "B" key K2, and the "AB" key K3 are configured such that the selection function is exclusively controlled. In other words, only one of the three keys can be selected.

More specifically, in the case that the user presses the "AB" key K3, the designating unit 107a designates both of the still picture a and the still picture b, for example, as shown in FIG. 5A. In this case, none of the contours of the subject P1 of the still picture a and the subject P2 of the still picture b which are being displayed in the superimposition display area R1 are emphasized under control of the display control unit 107c.

In the case that the user presses the "A" key K1, the designating unit 107a designates the still picture a as shown in FIG. 5B. In this case, the contour of the subject P1 of the still picture a which is being displayed in the superimposition display area R1 is emphasized under control of the display control unit 107c.

Although not shown, in the case that the user presses the "B" key K2, the designating unit 107a designates the still picture b. In this case, the contour of the subject P2 of the still picture b which is being displayed in the superimposition display area R1 is emphasized under control of the display control unit 107c.

The display control unit 107c performs control for displaying the plurality of (for example, two) images (in the present embodiment, the still picture a and the still picture b) in the superimposition display area R1 of the display panel 104a by superimposing them such that one of the images can be observed through the other image distinguishably.

More specifically, a superimposition playback mode for still pictures is selected based on a predetermined manipulation of the manipulation input unit 105 by the user, for example. For example, in the case that image data of the still picture a of the subject P1 showing how to hold chopsticks ideally and the still picture b of the user (i.e. the subject P2) showing how the user holds chopsticks is selected based on a predetermined manipulation of the manipulation input unit 105 by the user in the mode, the display control unit 107c performs control for superimposing and displaying the subject P1 of the still picture a and the subject P2 of the still picture b in the superimposition display area R1.

Further, the display control unit 107c performs control for changing the image designated by the designating unit 107a (the still picture a and/or the still picture b) spatially according to a manipulation by the user detected by the detecting unit 107b while keeping the subject P1 of the still picture a and the subject P2 of the still picture b superimposed and displayed in the superimposition display area R1.

In other words, the display control unit 107c performs control for changing the spatial size or the spatial position of the image designated by the designating unit 107a (the still picture a and/or the still picture b) as the control for changing the image spatially.

For example, in the case that the user presses the "A" key K1 and the designating unit 107a designates the still picture a, the display control unit 107c performs control for emphasizing the contour of the subject P1 of the still picture a designated by the designating unit 107a of the subject P1 of the still picture a and the subject P2 of the still picture b which are being superimposed and displayed in the superimposition display area R1, by using a known technique, as shown in FIG. 5B. In the case that the user presses the "AB" key K3 and the designating unit 107a designates both of the still picture a and the still picture b, the display control unit 107c does not perform control for emphasizing any of the subject P1 of the still picture a and the subject P2 of the still picture b which are being displayed in the superimposition display area R1, as shown in FIG. 5A.

In the case that at least one of the still picture a and the still picture b is designated by the designating unit 107a, the display control unit 107c determines whether or not the pinch manipulation or the swipe manipulation is detected on the superimposition display area R1 by the detecting unit 107b. In the case that it is determined that the pinch manipulation is detected on the superimposition display area R1 by the detecting unit 107b, the display control unit 107c performs control for enlarging or reducing the still picture designated by the designating unit 107a, i.e. changing the spatial size of the image, of the still picture a and the still picture b which are being superimposed and displayed in the superimposition display area R1. For example, in the case that only the still picture a is designated by the designating unit 107a (see FIG. 5B), the display control unit 107c performs control for enlarging or reducing only the still picture a, according to the pinch manipulation performed on the superimposition display area R1.

Further, in the case that at least one of the still picture a and the still picture b is designated by the designating unit 107a and it is determined that the swipe manipulation is detected on the superimposition display area R1 by the detecting unit 107b, the display control unit 107c performs control for scroll-displaying the still picture designated by the designating unit 107a, i.e. changing the spatial position of the still picture, of the still picture a and the still picture b which are being superimposed and displayed in the superimposition display area R1. For example, in the case that only the still picture a is designated by the designating unit 107a (see FIG. 5B), the display control unit 107c performs control for scroll-displaying only the still picture a, according to the swipe manipulation performed on the superimposition display area R1.

As described above, the display apparatus 2 according to the present embodiment performs control for displaying the still picture a and the still picture b in the superimposition display area R1 by superimposing them such that each of the still pictures can be observed through the other still picture distinguishably, designating at least one image of the still picture a and the still picture b, and detecting the user manipulation for the still picture a and the still picture b. Further, the display apparatus 2 performs control for displaying the designated image by changing it spatially according to the detected user manipulation while keeping the still picture a and the still picture b superimposed and displayed.

Thus, since the display apparatus 2 according to the present embodiment performs control for displaying the designated image by changing it spatially according to the detected user manipulation while keeping the still picture a and the still picture b superimposed and displayed, there is no need to cancel the superimposed display when adjusting the size or position of the image. Therefore, spatial adjustment can be facilitated for the still picture a and the still picture b which are being superimposed and displayed such that each of the still pictures can be observed through the other still picture.

Further, since the display apparatus 2 according to the present embodiment performs control for displaying the designated image by changing the spatial size or the spatial position of the designated image as the control for changing it spatially, it is possible to properly adjust spatial superimposition of the still picture a and the still picture b.

Further, in the case that one image of the still picture a and the still picture b is designated, the display apparatus 2 according to the present embodiment performs control for superimposing and displaying the still picture a and the still picture b by emphasizing the designated image, i.e. emphasizing the contour of the subject of the image. Therefore, it is possible to easily distinguish the image for which the adjustment of superimposition is to be performed and to easily adjust the still picture a and the still picture b spatially.

The present invention is not limited to the above described embodiments and various modifications and design changes are possible within the scope of the invention.

For example, the first embodiment has been described with respect to the example in which the moving pictures showing golf swing are compared. The present invention can be applied to comparison of moving pictures showing dance choreography as well as forms of sports. Further, the second embodiment has been described with respect to the example in which the still pictures showing how to hold chopsticks are compared. The present invention can also be applied to comparison of still pictures each of which shows how to hold a pen, a golf club, or how a pitcher holds a ball.

With regard to the first and second embodiments, the examples in which two images are superimposed and displayed in the superimposition display area R1 have been described. The present invention is not limited to these examples and three or more images may be superimposed. In this case, the corresponding number of individual display areas R2*a*, . . . are displayed in the first embodiment, and the corresponding number of image selection keys K1, . . . are displayed in the second embodiment.

Further, in the case that the three images are superimposed and displayed, the number of images which can be thick edged or selected can be one, two, or three. In the case that the number of images is two, two of the three images can be arbitrarily selected. Similarly, in the case that four images are superimposed and displayed, the number of images which can be thick edged or selected and a combination of images can be arbitrarily selected.

In the first embodiment, the individual display areas R2*a*, . . . are distributed and displayed in the top and bottom of the display area of the display panel 104*a*. However, the positions in which the individual display areas are displayed are arbitrary (for example, they may be displayed in the left and right ends or only in the top of the display area of the display panel 104*a*).

The first embodiment has been described with respect to the example in which the superimposition display area R1 and the individual display areas R2*a*, . . . are disposed in one display panel 105*a*. However, in different embodiments, the terminal apparatus 1 includes two display panels, the superimposition display area R1 is disposed in one of the display panels, and the individual display areas R2*a*, . . . are disposed in the other of the display panels.

The second embodiment has been described with respect to the example in which the image selection keys K1, . . . are displayed on the upper right side of the display area of the display panel 104*a*, but may be displayed on the lower left side. The position in which the image selection keys are displayed is arbitrary.

According to the present embodiment, in the case that no manipulation is performed on the touch panel 105*a* for the predetermined period of time (for example, two seconds), the terminal apparatus 1 shifts to the state in which no moving picture is designated (the normal state). However, the present invention is not limited thereto. In different embodiments, the terminal apparatus 1 does not shift to the normal state even in this case.

The first embodiment has been described with respect to the example in which the user performs the tap manipulation on the individual display area R2*a*, R2*b* (i.e. a software key) to designate a desired moving picture. However, the present invention is not limited thereto. For example, the user may designate the moving picture by performing a predetermined manipulation of a hardware key included in the manipulation input unit 105 (for example, a press manipulation of the hardware key) or performing a predetermined manipulation using a pointing device such as a mouse. Similarly, in the second embodiment, the user's desired still picture may be designated based on a predetermined manipulation of a hardware key included in the manipulation input unit 105 (for example, a press manipulation of the hardware key) or a predetermined manipulation using a pointing device such as a mouse.

In the first and the second embodiments, the image designated by the designating unit 107*a* is spatially changed and displayed according to the pinch manipulation or the swipe manipulation on the superimposition display area R1. However, the type of manipulation to be performed on the superimposition display area R1 is not limited thereto and is arbitrarily configurable.

In the first embodiment, the image designated by the designating unit 107*a* is temporally changed and displayed according to the pinch manipulation or the swipe manipulation on the thick edged individual display area R2*a*, R2*b*. However, the type of manipulation to be performed on the thick edged individual display area R2*a*, R2*b* is not limited thereto and is arbitrarily configurable.

According to the first embodiment, in the case that it is determined that the detecting unit 107*b* detects the long-press manipulation on the thick edged individual display area R2*a*, R2*b*, the display control unit 107*c* performs control for changing the transparency of the frame image of the moving picture which is being displayed in the superimposition display area R1 (corresponding to the individual display area on which the long-press manipulation is performed) according to the modes of the long-press manipulation. However, the present invention is not limited thereto. In different embodiments, according to the number of tap manipulations, the display control unit 107*c* performs control for changing the transparency of the frame image of the moving picture which is being displayed in the superimposition display area R1 (corresponding to the individual display area on which the tap manipulations are performed).

For example, in the case that the thick edge is displayed only around the individual display area R2*a* (see FIG. 2B), the display control unit 107*c* performs control for increasing the transparency of the frame image of the moving picture A up to 100% by 10% and decreasing the transparency of the frame image of the moving picture B to 0% by 10% whenever the tap manipulation is performed.

According to the first and second embodiments, in the case that one image is designated by the designating unit 107*a*, the contour of the subject of the designated image is emphasized in the superimposition display area R1. However, the present invention is not limited thereto. In different embodiments, the transparency of one image designated by the designating unit 107*a* is temporarily decreased. In another embodiment, the other image(s) which is not designated by the designating unit 107*a* is temporarily transformed to a grayscale image.

According to the first and second embodiments described above, the functions of the designating means, the detecting means, and the display control means are realized by driving the designating unit, the detecting unit, and the display control unit, respectively, under the control of the central control unit 101. However, the present invention is not limited to the above and the functions may be realized by executing a predetermined program by the CPU of the central control unit 101.

In other words, a program including a designating processing routine, a detecting processing routine, and a display control processing routine is stored in a program memory (not shown in the drawings). The CPU of the central control unit 101 can function as a means for executing processing for designating at least one image of a plurality of images according to the designating processing routine. The CPU of the central control unit 101 can function as a means for executing processing for detecting a manipulation performed by the user for the plurality of images according to the detecting processing routine. The CPU of the central control unit 101 can function as a means for executing processing for performing control for displaying the plurality of images in the display means by superimposing them such that each of the plurality of images can be observed through one or more other images distinguishably and changing the image designated by the designating processing routine spatially or temporally according to the user manipulation detected by the detecting processing routine while keeping the plurality of images superimposed and displayed, according to the display control processing routine.

The designating means (or the designating processing routine) and the detecting means (or the detecting processing routine) may be integrated as one means (or one processing routine).

In addition, a computer readable storage medium for storing the program for executing the respective processing can be a ROM, a hard disk, a non-volatile memory such as a flash memory, a portable storage medium such as a CD-ROM, or the like. A carrier wave can be used as a medium for providing program data through a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A display apparatus comprising:

a display unit; and a processor that is configured to:

perform control for superimposing and displaying a plurality of images in the display unit such that at least one of the plurality of images can be observed through one or more other images distinguishably;

designate one or more of the plurality of images; and detect a user manipulation performed for the plurality of images, wherein the process performs control for changing the designated one or more images spatially or temporally according to the detected user manipulation while keeping the plurality of images superimposed and displayed.

2. The display apparatus of claim 1, wherein the processor is configured to perform control for changing a spatial size or a spatial position of the designated one or more images, as the control for changing the designated one or more images spatially.

3. The display apparatus of claim 1, wherein each of the plurality of images is a moving picture, and the processor is configured to perform control for changing a frame rate of the designated one or more moving pictures or a temporal position in the designated one or more moving pictures, as the control for changing the designated one or more images temporally.

4. The display apparatus of claim 1, wherein the processor is configured to perform control for superimposing and displaying the plurality of images in a superimposition display area of the display unit, the processor is configured to further perform control for displaying each of the plurality of images in each of a plurality of individual display areas individually, the individual display areas being different from the superimposition display area, and the processor is configured to perform control for designating the one or more of the plurality of images according to a user manipulation performed for the individual display areas.

5. The display apparatus of claim 4, wherein the processor is configured to perform control for superimposing and displaying a plurality of moving pictures as the plurality of images in the superimposition display area, such that each of the plurality of moving pictures can be observed through one or more other moving pictures distinguishably, control for displaying each of the plurality of moving pictures in each of the plurality of individual display areas individually, control for changing the designated one or more moving pictures spatially according to the detected user manipulation for the superimposition display area while keeping the plurality of moving pictures superimposed and displayed, and control for changing the designated one or more moving pictures temporally according to the detected user manipulation for the individual display areas while keeping the plurality of moving pictures superimposed and displayed.

6. The display apparatus of claim 5, wherein the processor is configured to perform control for simultaneously changing the plurality of moving pictures temporally according to the detected user manipulation for the superimposition display area while keeping the plurality of moving pictures superimposed and displayed, the user manipulation being different from a user manipulation for changing the moving pictures spatially.

7. The display apparatus of claim 5, wherein the processor is configured to perform control for superimposing and displaying frame images composing each of the plurality of moving pictures frame by frame in the superimposition display area, and perform control for displaying a plurality of consecutive frame images of each of the plurality of moving pictures in a row in each of the plurality of individual display areas.

8. The display apparatus of claim 4, wherein the processor is configured to perform control for changing transparency of the plurality of images, which are being superimposed and displayed in the superimposition display area, according to a user manipulation performed for the individual display areas which is different from the user manipulation for designating the one or more of the plurality of images.

9. The display apparatus of claim 1, wherein the processor is configured to perform control for superimposing and displaying the plurality of images by emphasizing the designated one or more images.

10. A display control method comprising:

superimposing and displaying a plurality of images in a display unit such that at least one of the plurality of images can be observed through one or more other images distinguishably;

designating one or more of the plurality of images; and detecting a user manipulation performed for the plurality of images, wherein superimposing and displaying a plurality of images comprises changing the designated one or more images spatially or temporally according to the detected user manipulation while keeping the plurality of images superimposed and displayed.

11. The display control method of claim 10, wherein superimposing and displaying a plurality of images comprises changing a spatial size or a spatial position of the designated one or more images, as the control for changing the designated one or more images spatially.

12. The display control method of claim 10, wherein each of the plurality of images is a moving picture, and superimposing and displaying a plurality of images comprises changing a frame rate of the designated one or more moving pictures or a temporal position in the designated one or more moving pictures, as the control for changing the designated one or more images temporally.

13. The display control method of claim 10, wherein the plurality of images are superimposed and displayed in a superimposition display area of the display unit, the method further comprises displaying each of the plurality of images in each of a plurality of individual display areas individually, the individual display areas being different from the superimposition display area, and the one or more of the plurality of images are designated according to a user manipulation performed for the individual display areas.

14. The display control method of claim 13, wherein a plurality of moving pictures are superimposed and displayed as the plurality of images in the superimposition display area, such that each of the plurality of moving pictures can be observed through one or more other moving pictures distinguishably, each of the plurality of moving pictures is displayed in each of the plurality of individual display areas individually, and changing the designated one or more images comprises changing the designated one or more moving pictures spatially according to the detected user manipulation for the superimposition display area while keeping the plurality of moving pictures superimposed and displayed, and changing the designated one or more moving pictures temporally according to the detected user manipulation for the individual display areas while keeping the plurality of moving pictures superimposed and displayed.

15. The display control method of claim 14, wherein superimposing and displaying a plurality of images comprises simultaneously changing the plurality of moving pictures temporally according to the detected user manipulation for the superimposition display area while keeping the plurality of moving pictures superimposed and displayed, the user manipulation being different from a user manipulation for changing the moving pictures spatially.

16. The display control method of claim 14, wherein superimposing and displaying a plurality of images comprises superimposing and displaying frame images composing each of the plurality of moving pictures frame by frame in the superimposition display area, and a plurality of consecutive frame images of each of the plurality of moving pictures are displayed in a row in each of the plurality of individual display areas.

17. The display control method of claim 13, wherein superimposing and displaying a plurality of images comprises changing transparency of the plurality of images, which are being superimposed and displayed in the superimposition display area, according to a user manipulation performed for the individual display areas which is different from the user manipulation for designating the one or more of the plurality of images.

18. The display control method of claim 10, wherein superimposing and displaying a plurality of images comprises superimposing and displaying the plurality of images by emphasizing the designated one or more images.

19. A non-transitory computer-readable storage medium for storing a program readable by a computer, the program controlling the computer to execute functions of:

superimposing and displaying a plurality of images in a display unit such that at least one of the plurality of images can be observed through one or more other images distinguishably;

designating one or more of the plurality of images; and detecting a user manipulation performed for the plurality of images, wherein the function of superimposing and displaying a plurality of images comprises changing the designated one or more images spatially or temporally according to the detected user manipulation while keeping the plurality of images superimposed and displayed.

* * * * *